(12) United States Patent
Carroll

(10) Patent No.: US 6,972,694 B2
(45) Date of Patent: Dec. 6, 2005

(54) CABIN AWARENESS AND WARNING SYSTEM

(75) Inventor: Michael T. Carroll, Woodinville, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/353,480

(22) Filed: Jan. 28, 2003

(65) Prior Publication Data

US 2004/0145498 A1 Jul. 29, 2004

(51) Int. Cl.$^7$ ............................................. G08B 23/00
(52) U.S. Cl. ................. 340/963; 340/945; 340/539.11; 340/5.52; 340/5.53
(58) Field of Search ............................ 340/945, 963, 340/539.11, 541, 5.52, 5.53

(56) References Cited

U.S. PATENT DOCUMENTS

| | | | |
|---|---|---|---|
| 6,817,577 B2 * | 11/2004 | Semprini | 244/118.5 |
| 2003/0058112 A1 * | 3/2003 | Gleine | 340/573.1 |
| 2003/0158762 A1 * | 8/2003 | Wu | 705/5 |
| 2003/0169173 A1 * | 9/2003 | Longere | 340/576 |

* cited by examiner

Primary Examiner—Julie Bichngoc Lieu
(74) Attorney, Agent, or Firm—Honeywell Int'l Inc.

(57) ABSTRACT

A method for monitoring the security state of an aircraft cabin. The method includes surveiling the main cabin of an aircraft, monitoring radio frequencies predesignated for handheld radio devices for signals, recording the generated images and monitored sounds on non-volatile media, and generating an alert in response to a threat perceived while surveiling and monitoring.

8 Claims, 5 Drawing Sheets

CABIN AWARENESS AND WARNING SYSTEM

BACKGROUND OF THE INVENTION

The events of Sep. 11, 2001 have caused the airline industry and its regulatory body, the FAA, to reexamine security in the air. One of the measures that was nearly immediately implemented was the interjection of a door isolating the flight deck from the main cabin of the aircraft. This door was installed to prevent would-be hijackers from reaching pilots and flight engineers in the course of operating the airplane.

Security is always a double-edge sword. While the security door on the flight deck shields the flight crew from a would-be hijacker, it also isolates the flight crew from the goings-on in the main cabin. Because the only significant communication link with the ground is contained in the flight deck, this isolation is thought to be bad for airline security.

There exists an unmet need for improving flight crew awareness.

SUMMARY OF THE INVENTION

A method and system for monitoring the security state of an aircraft cabin is provided. The method includes surveiling the main cabin of an aircraft, monitoring radio frequencies predesignated for handheld radio devices for signals, recording the generated images and monitored sounds on non-volatile media, and generating an alert in response to a threat perceived while surveiling and monitoring.

The invention also records all of the images by the cameras and places them on crash-resistant flight recorders. Handheld radios are also employed, thereby allowing individual stewards or stewardesses the opportunity to summon the attention of the flight crew.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

By way of overview, a method and system for monitoring the security state of an aircraft cabin is presented. The method includes surveiling the main cabin of an aircraft, monitoring radio frequencies predesignated for handheld radio devices for signals, recording the generated images and monitored sounds on non-volatile media, and generating an alert in response to a threat perceived while surveiling and monitoring.

Figure 1:
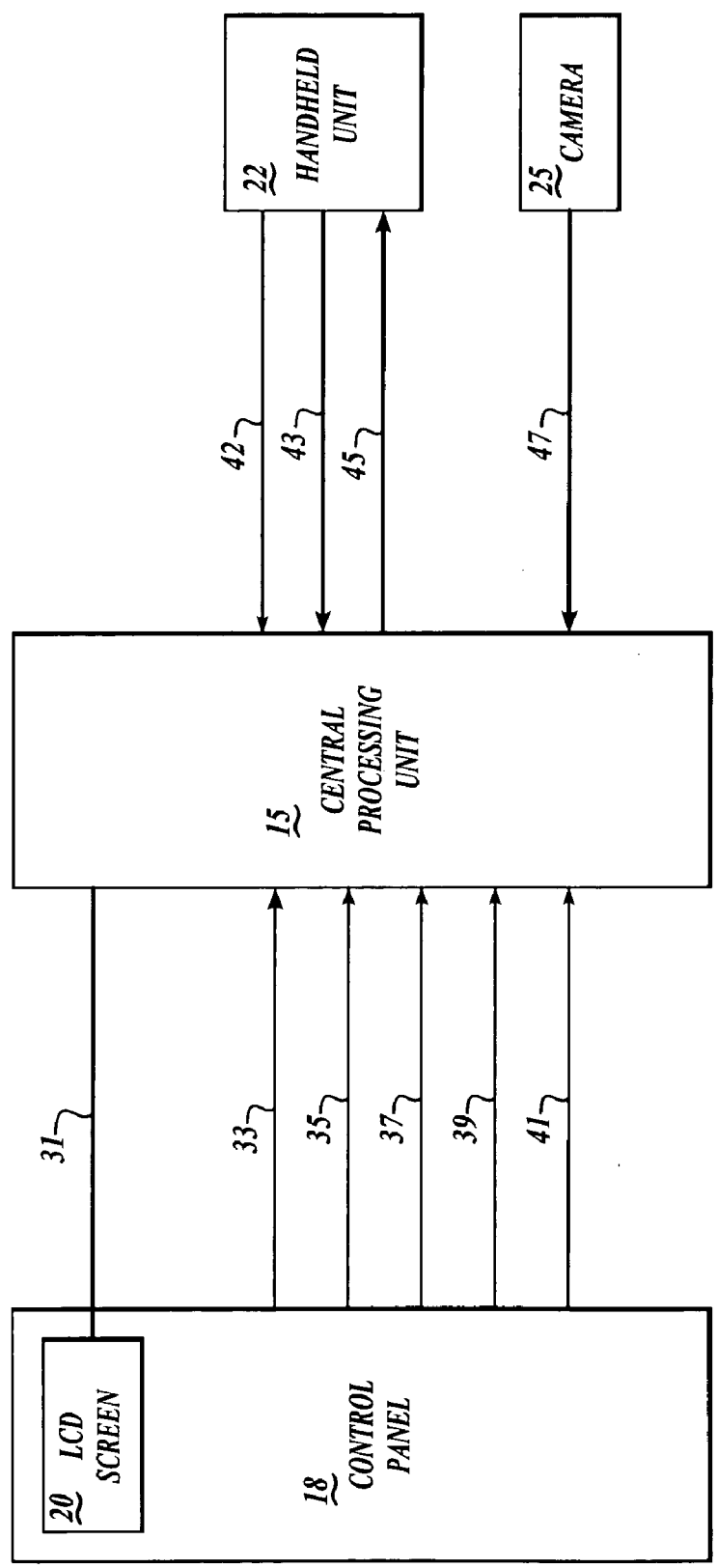
FIG. 1 is a system block diagram.
Figure 2A:
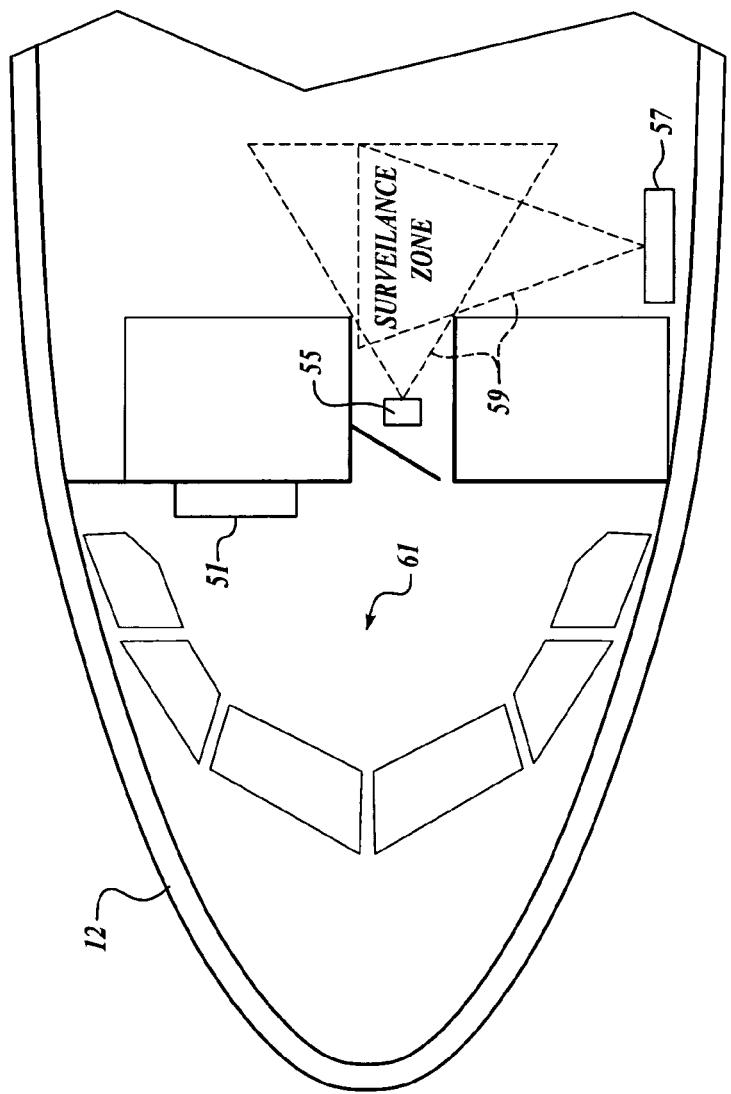
FIG. 2 shows a first embodiment of the invention concentrating on security for the cabin door.
Figure 2E:
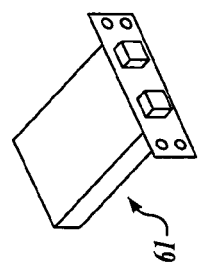
Figure 2D:
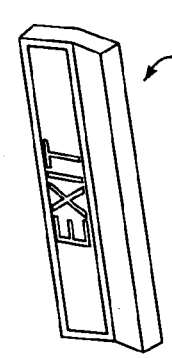
Figure 2C:
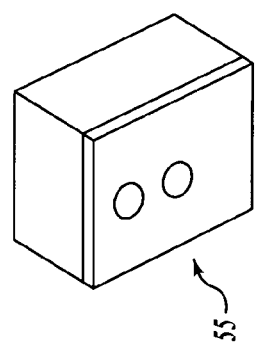
Figure 2B:
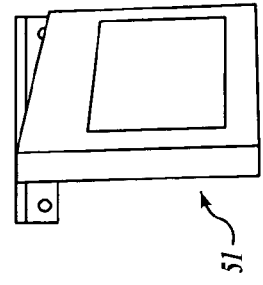
Figure 3A:
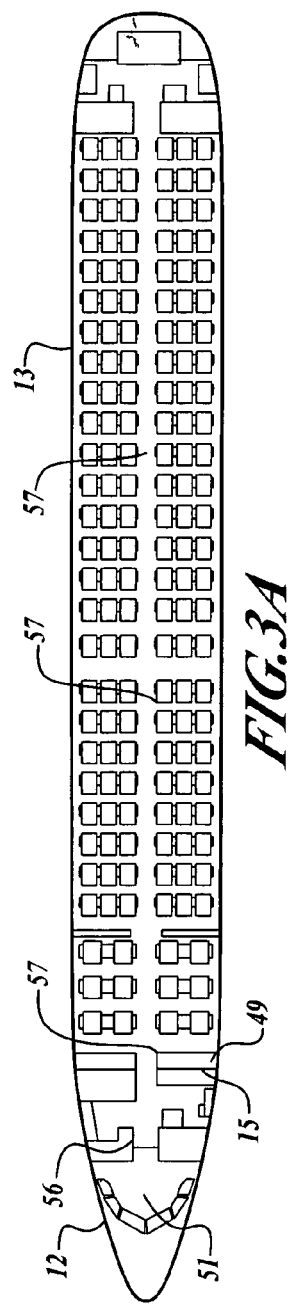
FIG. 3 shows a second embodiment of the inventive system.
Figure 3D:
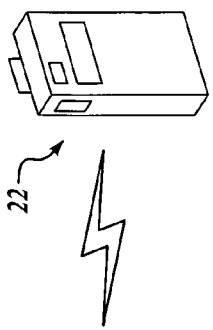
Figure 3C:
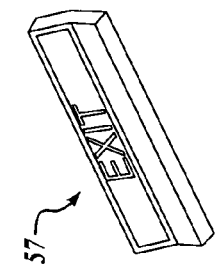
Figure 3B:
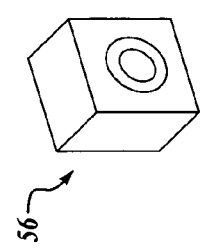
Figure 3G:
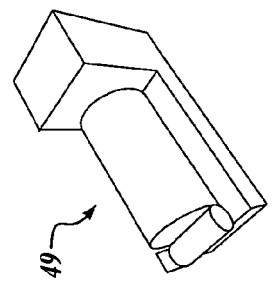
Figure 3F:
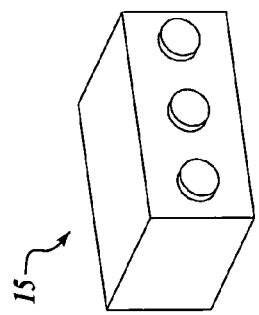
Figure 3E:
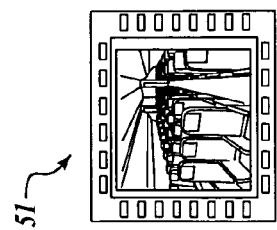

FIG. 1 shows a cabin awareness system 10 and its component parts. A central processing unit 15 is the heart of the system. The central processing unit 15 receives operator input from the cockpit panel 18 including a video screen 20 (typically an LCD screen). The video screen 20 is multi-functional. The central processing unit 15 can generate messages for display on the screen 20 along with or in lieu of one or several images generated by cameras 25 communicating with the central processing unit 15. The screen 20 serves many of the same needs met by a computer monitor.

In a simple embodiment, the processing unit 15 senses the security state of an aircraft through a plurality of cameras 25 communicating either by wire or wireless radio links 47 and handheld units 22 by wireless radio link 43. The handheld wireless unit 22 allows for two distinct embodiments. The first of these embodiments relies solely on one-way communication. The handheld unit 22 has a "panic button" (not shown). In triggering the panic button on the handheld unit 22, a message is sent by wireless link 43 to the central processing unit 15 indicating a breach in cabin security. The triggering of the button is communicated to the central processing unit 15 over wireless link 43 which is a one-way link. In a second embodiment of the invention, the control panel 18 is configured to function as one of two walkie-talkies while the handheld unit 22 functions as the second walkie-talkie. Two-way radio communication from link 43 and to link 45, the handheld unit 22 facilitates this walkie-talkie communication.

An additional query link 42 is shown. The handheld unit 22 will transmit an "I am healthy" signal. These signals are only generated so long as the handheld unit 22 passes a series of onboard diagnoses. The failure of the on board diagnoses will cause the handheld unit 22 to generate a distinct signal indicative of the particular fault. Some of these faults might not generate an immediate alarm, but rather a diagnostic code, such as a "battery running low" transmitted the handheld unit 22 and flagged for maintenance. Other codes, such as, by way of non-limiting example, a code indicative of the cabin atmosphere triggering an explosives "sniffer" on the handheld unit 22 will transmit a code that triggers an alert on the video screen 20 and generate some audio alarm.

So long as the handheld unit 22 is operative and passes the onboard diagnoses, the "I am healthy signal is periodically transmitted on the link 42. The central processing unit 15 will receive regular "I am healthy" signals over the link 42. If, in the course of a hijacking, a hijacker disables the handheld unit in order to intervene in the operation of the security system 10, the central processing unit 15 recognizes the situation as one worthy of an alert and flags the situation. That alert will cause the central processing unit 15 to generate a suitable alert on the video screen 20.

FIG. 1 portrays the several communication links between the cockpit panel 18 and the central processing unit 15. For instance, there is likely a hardwired link 31 between the LCD screen 20 and the central processor in order to facilitate a graphic user interface. An additional link 33 transmits user manipulations of existing switches on the cockpit control panel 18. Any pilot input may be communicated over the additional link 33.

In one embodiment, the central processing unit 15 is housed in a secure cabinet (not shown) with an interface with the airline air to ground communications (not shown). The teletype link 35 allows teletype chatting with the ground where, for security reasons, audio communication is not practical. Such a teletype link would include some form of alphanumeric keyboard, though not necessarily a full "typewriter" keyboard. Two examples of keyboards that might be useful would be a displayed keyboard on a video display 20 that was touch sensitive or a thumb keyboard popularly used on the Blackberry® two-way paging products. Any nonverbal means of data entry will suffice to allow the ground crew sufficient description to appropriately react to a terrorist attack. One presently preferred embodiment then allows the ground crew to sever the cockpit fly by wire capability in favor of ground remote control.

Similarly, other links might exist for audio 37 and visual 39 two-way communications with the central processing unit 15 for re-transmission to the handheld units 22. These distinct links also recognize the alternate needs for audio 37 and non-audio communication 39. Finally, a link 41 enables a graphic user interface 41. The links set forth 31, 33, 35, 37, 39, and 41 are described solely as non-limiting examples. Air cabin and central processing unit 15 configurations might dictate, to one skilled in the art, alternate means to efficiently accomplish the same functionality.

FIG. 2 shows an embodiment of the invention the focus of which is the safety of the flight crew. In this embodiment, the cockpit 12 includes a video screen 51 coupled to a switching device 61. Outside the cockpit 12 are two cameras. 55 and 57 that have overlapping fields of view 59. The first camera 55 is clearly designed as the camera image viewed on screen 51. The second camera 57 is hidden within an exit sign. The second camera 57 is a "covert" camera. The switching device 61 is also, optionally, coupled to the central processor 15 (FIG. 1) and allows automatic switching between several cameras based upon software cues. For example, facial recognition software or, in another presently preferred embodiment, motion detection software might trigger selection of the image generated by a particular camera 57. As stated above, the simplest embodiment of the invention allows the flight crew to manually switch between cameras 55, 57 in order to check the generated in age on a video screen 51 immediately within the cockpit 12 before exiting to assure themselves that no hazard exists immediately outside of the cabin door 11.

FIG. 3 shows another likely embodiment of the invention. One or more covert cameras 57 (FIG. 2) are hidden within exit signs all along the main cabin 13. An additional camera 56 is positioned in a manner to be both hidden to view appropriately down an aisle to check the security state of the whole of the cabin 13. Any number of cameras might be successfully placed throughout the cabin. Any person skilled in the art will readily appreciate that the addition on the cameras throughout the cabin does not change the inherent operation of the invention. Optimal placement of cameras may vary from cabin structure to cabin structure across any aircraft manufacturer's product line. An LCD video screen 51 within the cockpit 12 allows the pilot or other flight crew member to switchably select and view the images generated by the cameras 56, 57.

The handheld units 22 allow each of the stewards or stewardesses to communicate with the flight crew. In one embodiment, when the stewards or stewardesses activates the handheld unit 22, the LCD video screen 51 automatically switches to the camera closest to the position of the stewards or stewardesses. Thus, the flight crew can view the situation described by the steward or stewardesses on the LCD video screen 51. Alternately, the pilot or other crew members can switchably patch their existing microphone and headset into the processor 15 (FIG. 1) and communicate with a handheld unit 22 in a manner similar to a walkie-talkie.

The handheld units 22 serve several functions. In one embodiment, they are solely to be used to alert the flight crew of the conditions in the cabin 13. In other embodiments, the handheld units 22 are used to coordinate the efforts of the flight crew and the cabin crew. In any regard, the handheld units 22 facilitate the flight crew's ability to report to the flight crew what is going on in the cabin 13.

The handheld units 22 provide a secondary function as well. The video images generated by each of the cameras 57, 56 and/or voice received on the handheld unit 22 is recorded on a flight recorder 49 similar to the black boxes. The flight recorder 49 is a crash resistant non-volatile memory on which some or all of the information that the cabin awareness system 10 (FIG. 1) collects about the situation is stored in the event of crash or crew initiated emergency, such as a hijacking.

Apart from the overt camera 55 and the covert camera 57, there also exists the hidden camera 56 that sights along the aisles and several pinhole cameras 57a that are hidden not only in the exit signs like 57 but also in the bulkheads and various other cabin features.

In a wide cabin configuration, it is also necessary to place several remote receivers to facilitate full-cabin communication from the handheld units 22. These remote receivers 23 insure that no part of the main cabin is beyond the limited reach of the handheld units. They also coordinate messages from the handheld units 22 by allowing a multiplicity of channels within the cabin 13.

It to readily be appreciated by one skilled in the art that the computer processor 15 (FIG. 1), may be any of various software to allow for the detection of movement within the cabin, the presence of known terrorists by their facial patterns or voice patterns. One feature of the inventive system is a readily adaptable central processing unit 15 (FIG. 1). The invention provides eyes and ears in the cabin for the flight crew and the processor 15. If additional analysis is needed, the flight crew can "patch" the information through to a land-based system such as an air-traffic control center. In one preferred embodiment, the recognition, by the software, of a terrorist will automatically trigger a transmission to an air traffic control center for forwarding on to the Homeland security forces.

Figure 4A:
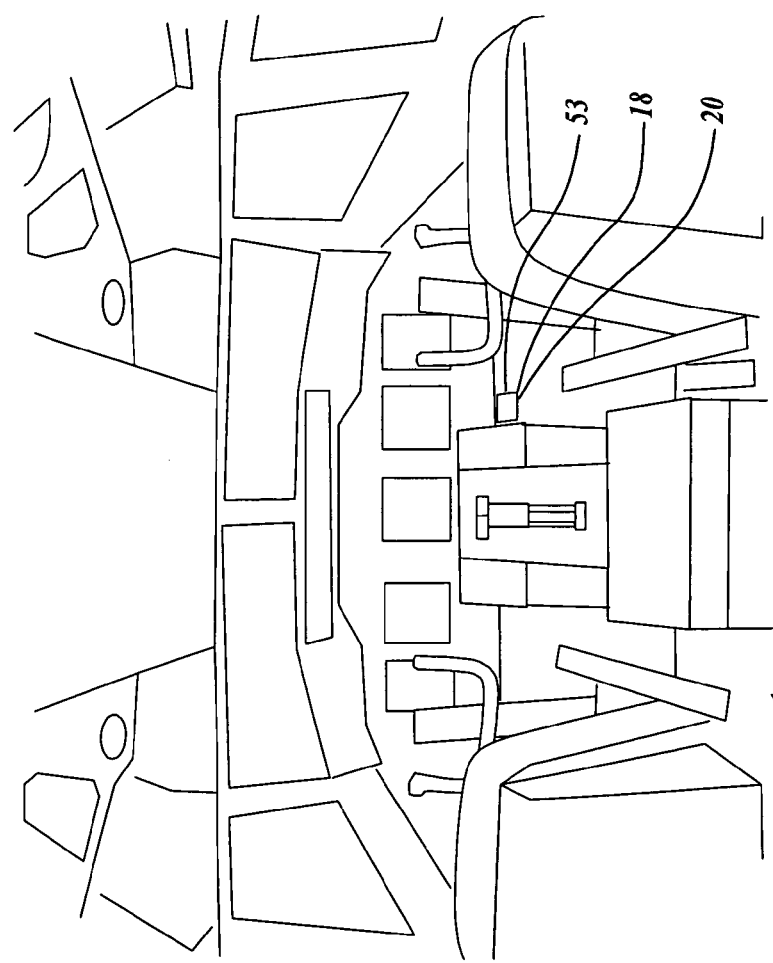
FIG. 4 is a third embodiment of the inventive system.
Figure 4B:
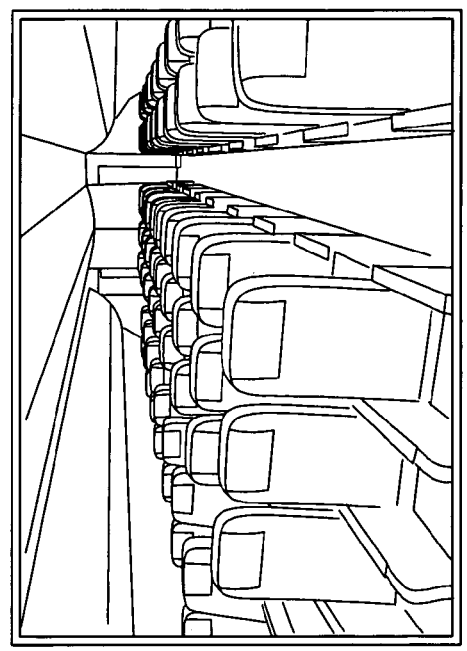

FIG. 4 shows an example placement of the cabin awareness LCD viewing screen 20 on the within the cockpit 12. While not part of the "eye-level instrument cluster," the screen 20 is still placed in a position that coordinates with its importance in the cockpit. While any terminal-like embodiment will serve the purposes of the invention, though the shape, position, size, and configuration of the terminal will be dictated by the remaining instrumentation.

Figure 5:
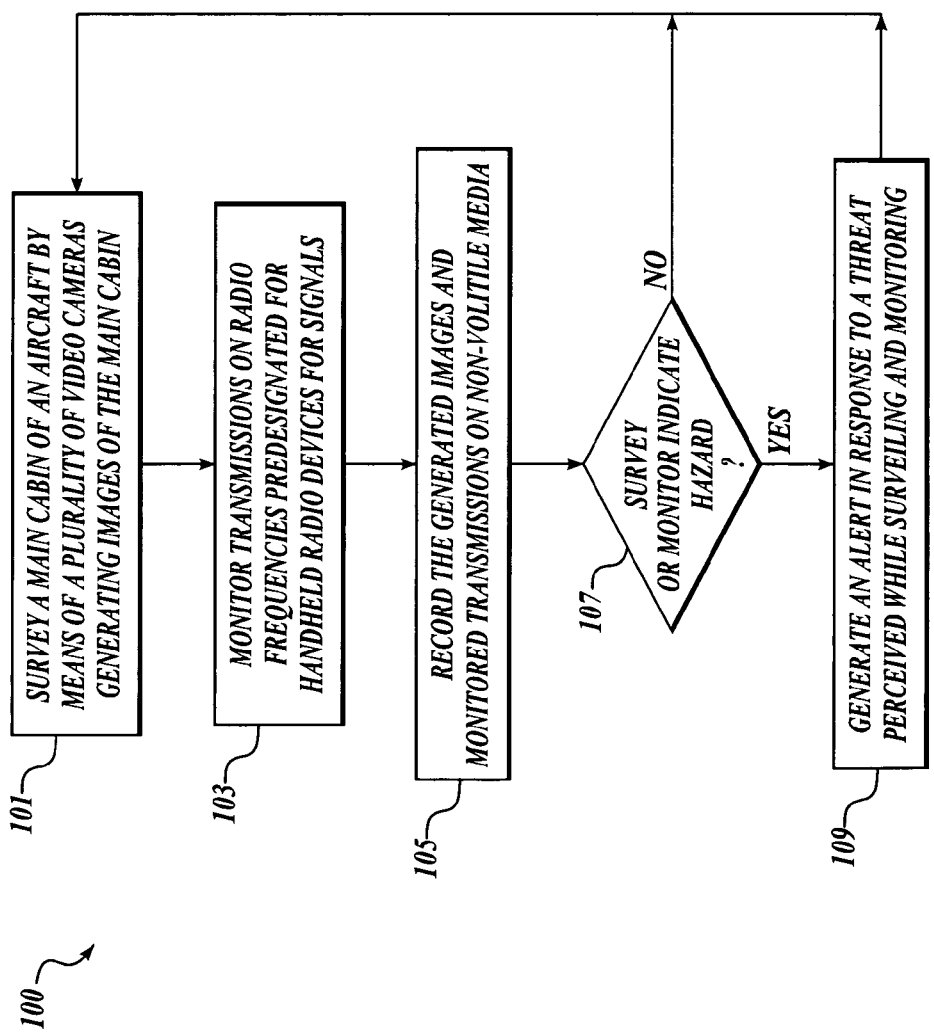
FIG. 5 shows placement of the invention on the flight deck.

Referring, now, to FIG. 5, FIG. 5 shows a method 100 of using the invention. While the aircraft is occupied, the method 100 will continually recycle. At a step 101, the central processing unit will survey a main cabin of an aircraft by means of a plurality of video cameras generating images of the main cabin. Suitably, the central processing unit will generate a display sufficient to convey the security of the cabin. For instance, where the digital image gathered by one video camera shows no movement whatsoever from one moment to another, that image may be, optionally, omitted from the display. Conversely, the display may use the changes in digital images to enhance the operator's own observations thereby highlighting the movement on the screen. Multiple images might be displayed in sequence or concurrently in portions of the screen. Suitable means are known to enhance video monitoring allowing the operator to flag an irregularity.

As discussed above with relation to FIG. 1, at a step 103, the central processing unit will monitor the several links to it in order to sense irregularities in the system. Where, by means of non-limiting example, the system stops receiving an "I am healthy" signal from the handheld unit, the central processing unit will be aware of the cessation of transmission and will flag the irregularity.

All of the inputs to the central processing unit are susceptible to recording on non-volatile media. At a step 105, all inputs to the central processing unit are recorded. For instance, the several video signals input into the computer are available and would in one preferred embodiment be recorded just as flight voice recorders currently record the sounds emanating from the cockpit on a non-volatile medium, the flight recorded unit commonly being known in the art as the "black box." Such recording need not be limited to the video signals. Each of the signals input into the central processing unit might be recorded on a medium similar to that of a flight data recorded know in the art. Thus, in the event of prosecution of the terrorists, the situation, as it developed may be recreated on any similar central processing unit. Such information would be equally useful in the investigation.

At a step 107, if either the monitoring or the surveying in steps 103 and 101 have resulted in any flagging, the central processing unit generates the appropriate alert, either to the pilot or to the ground crew depending upon the nature of the alert. Each of the responses are suitably configurable to meet either applicable regulations or the needs of the aircraft operators. The cycle repeats to enable constant monitoring.

While the preferred embodiment of the invention has been illustrated and described, as noted above, many changes can be made without departing from the spirit and scope of the invention. Accordingly, the scope of the invention is not limited by the disclosure of the preferred embodiment.

What is claimed is:

1. A system for monitoring the security state of an aircraft main cabin, the system comprising:
   a central processor, the central processor configured to generate facial parameters based upon received video images;
   a plurality of cameras configured to generate the video images of passengers within an aircraft main cabin and electronically connected with the central processor;
   a display connected with the processor and configured to display the video images, and further configured to display messages generated by the central processor; and
   a device configured to receive radio signals and further configured to generate a signal sent to the central processor in response to a received radio signal, wherein the central processing unit is configured to sense the presence of the radio signals in order to select a video image generated by a camera, the video image selected based upon the presence of a source of the radio signal within the cabin.

2. The system of claim 1, wherein the device is configured as a walkie-talkie.

3. The system of claim 2, wherein the radio signals and the images generated by the plurality of cameras are stored on non-volatile media.

4. The system of claim 1, further comprising one or more handheld devices for receiving and transmitting radio signals to the device, each handheld device having a panic button for generating a panic signal when activated.

5. The system of claim 1, wherein the central processor generates a warning message on the display in response to a predefined radio signal.

6. The system of claim 1, further including a video switch configured to selectively display from one or more of the camera-generated images and one or more messages generated by the central processor.

7. The system of claim 6, wherein the video switch is manually controlled.

8. The system of claim 6, wherein the video switch is automatically controlled, such that the video switch will select one or more of the camera-generated images based upon movement.

* * * * *